United States Patent [19]
Ando

[11] Patent Number: 5,215,659
[45] Date of Patent: Jun. 1, 1993

[54] DEVICE FOR PRODUCING MINERAL-CONTAINING WATER FOR WATER STORAGE VESSEL

[76] Inventor: Shoichiro Ando, 1-3-3 Nakameguro, Meguro-ku, Tokyo, Japan

[21] Appl. No.: 892,042

[22] Filed: Jun. 2, 1992

[30] Foreign Application Priority Data

Sep. 19, 1991 [JP] Japan ................... 3-84245

[51] Int. Cl.$^5$ ................................ C02F 1/28
[52] U.S. Cl. .................... 210/282; 210/472; 210/484; 210/503; 210/449
[58] Field of Search ............. 210/282, 266, 449, 472, 210/484, 503

[56] References Cited

U.S. PATENT DOCUMENTS

| | | |
|---|---|---|
| 3,215,626 | 11/1965 | Console ................ 210/760 |
| 4,181,243 | 1/1980 | Frahm ................... 210/282 |
| 4,605,499 | 8/1986 | Wise ..................... 210/282 |
| 4,732,674 | 3/1988 | Tamura et al. ........... 210/282 |
| 4,787,973 | 11/1988 | Ando et al. ............. 210/282 |
| 4,798,672 | 1/1989 | Knight .................. 210/282 |
| 4,800,018 | 1/1989 | Moser ................... 210/282 |
| 5,034,138 | 7/1991 | Hatanaka et al. ......... 210/764 |
| 5,045,195 | 9/1991 | Spangrud et al. ......... 210/282 |

Primary Examiner—Stanley S. Silverman
Assistant Examiner—Cynthia L. Nessler
Attorney, Agent, or Firm—Frishauf, Holtz, Goodman & Woodward

[57] ABSTRACT

A device for producing mineral-containing water comprises a case communicated with a water outlet of a water storage vessel with or without the use of a plug, the case being provided with a plurality of small diameter water passages. Small masses of ceramics serving as mineral-water production material are accommodated in the case. The device permits only a required quantity of supply water to be rendered to mineral-containing water for drinking or cooking, by contacting the water with the small masses of ceramics. Mineral-containing water is produced when pouring supply water from the faucet into the water storage vessel, for instance, a canteen, a kettle, a pot, a bottle, etc., and this requires no substantial change in the appearance of the vessel or in the operation of pouring water.

7 Claims, 5 Drawing Sheets

DEVICE FOR PRODUCING MINERAL-CONTAINING WATER FOR WATER STORAGE VESSEL

BACKGROUND OF THE INVENTION

1. Field of the Invention

This invention relates to a device for producing mineral-containing water, either hot or cold, for drinking or cooking, which is to be provided on a water storage vessel, such as portable canteens, vacuum bottles, water pumps for dilution, pots, jugs, decanters and bottles.

2. Prior Art

Supply water supplied through water supply facilities usually contains various chemicals for the purpose of sterilization. Therefore, the supply water has a peculiar bad order, and also its taste is different from and inferior to that of natural water. Recently, various means for purifying supply water have been developed. For example, devices for producing mineral-containing water from supply water have been developed. These devices are mostly mounted on the faucet directly as filter, and they are comparatively large in scale. Among these devices are those which use chemicals or ceramic layers filter to cause chemical changes in the supply water so as to render the supply water to be of substantially the same composition as natural water.

However, the devices which are mounted on the faucet are large in scale and appearance. In addition, they are high in price. Further, they are uneconomical in that they wastefully produce excess and unnecessary mineral-containing water which is other than is necessary for, for instance, drinking, cooking.

There are stick-like portable tools for producing mineral-containing water. These tools, however, require the cumbersome acts of stirring water contained in cups or the like with them.

SUMMARY OF THE INVENTION

It is a first object of the invention to provide a device for producing mineral-containing water, which produces mineral-containing water when a required quantity of water is poured into a cup or the like for drinking, and thus is economical as well as being free from any appearance change and also free from any stirring or like operation when drinking.

A second object of the invention is to provide a device for producing mineral-containing water for a water storage vessel, which permits only a desired quantity of mineral-containing water to be produced for drinking by merely pouring supply water from a water supply faucet into the water storage vessel.

A third object of the invention is to provide a device for producing mineral-containing water, which can render a desired quantity of water stored in a water storage vessel to be mineral-containing water progressively as water is poured into a glass or the like mainly for drinking.

To attain the first object of the invention noted above, there is provided a device for producing mineral-containing water, which comprises a case having a water passage section communicated with a water outlet of a water storage vessel via a plug member closing the water outlet, the case being provided with a plurality of small diameter water passages, and small masses of ceramics serving as mineral-containing water production material being accommodated in the case.

The small masses of ceramics are principally composed of magnesium and calcium.

The device may further comprise a spring-biased valve shaft for operating a valve body for opening and closing a central axial hole penetrating the plug member.

In an alternative use, the case may be mounted on an end portion of a pipe, through which pumped water passes into the case.

To attain the second object of the invention, there is provided a device for producing mineral-containing water, which comprises a cylindrical case having top and bottom walls and fitted in a water outlet of a water storage vessel, the top and bottom walls of the cylindrical case having water passage holes permitting water passage therethrough, small masses of ceramics serving as mineral-containing water production material accommodated in the cylindrical case, and an air ventilation section provided at least in part of the cylindrical case.

The air ventilation section may comprise a pipe penetrating the top and bottom walls of the cylindrical case and provided with a water stop member.

To attain the third object of the invention, there is provided a device for producing mineral-containing water, which comprises a case fitted in or on a water outlet or water passage of a pot, the case being made of a mesh or like material capable of passing water through it, and small masses of ceramics serving as mineral-containing water production material.

In this device, the case may be a cylindrical member integral with or fitted on or in the water outlet. Alternatively, it may be a sac fitted on the water outlet.

To attain the same object, there is also provided a device for producing mineral-containing water, which comprises a cap member screwed on an outlet head of a plastic bottle, the top of the cap member comprising a mesh or like material capable of water passage therethrough, and small masses of ceramics serving as mineral-containing water production material accommodated in the cap member.

To attain the same object, there is further provided a device for producing mineral-containing water, which comprises a cap member screwed on an outlet head of a plastic bottle, the top of the cap member comprising a mesh or like material capable of water passage therethrough, a pipe depending from substantially the center of the inner surface of the cap member and made of a mesh or like material capable of water passage therethrough, and small masses of ceramic materials serving as mineral-containing water production material accommodated in the pipe.

With the above construction for attaining the first object of the invention, when water charged into a canteen, a vacuum bottle, a water pump vessel, etc. is poured via the operation of a valve or like mechanism, the water touches the small ceramic masses in the case, and at this time magnesium and calcium as components of the small ceramic masses are dissolved in the water. Thus, mineral-containing water can be obtained. This operation is not different at all from the operation with the usual water storage vessel.

With the above construction for attaining the second object of the invention, by mounting the device on the outlet of the water storage vessel and pouring water from above, mineral-containing water is collected in the vessel. The water passage holes formed in the top and bottom walls of the top and bottom walls of the cylindrical case can not be increased too much in view of the accommodated small ceramic masses. This may lead to a sacrifice in the water passage efficiency. However, this can be overcome by introducing the atmospheric pressure through the air ventilation section.

With the above construction for attaining the third object of the invention, water or hot water poured from the water storage vessel such as a kettle, a pot, a bottle and so forth passes through the mineral-containing water production material and is rendered to be mineral-containing water free from bad odor and having excellent taste. The device does not wastefully render water for washing or like purpose to be mineral-containing water. In addition, it is simple in structure and can be inexpensively provided.

BRIEF DESCRIPTION OF THE DRAWINGS

The above and other objects, features and advantages of the invention will become more apparent from the following description when the same is read with reference to the accompanying drawings, in which.

DETAILED DESCRIPTION OF THE PREFERRED EMBODIMENTS

Preferred embodiments of the invention will now be described with reference to the drawings.

Figure 1:
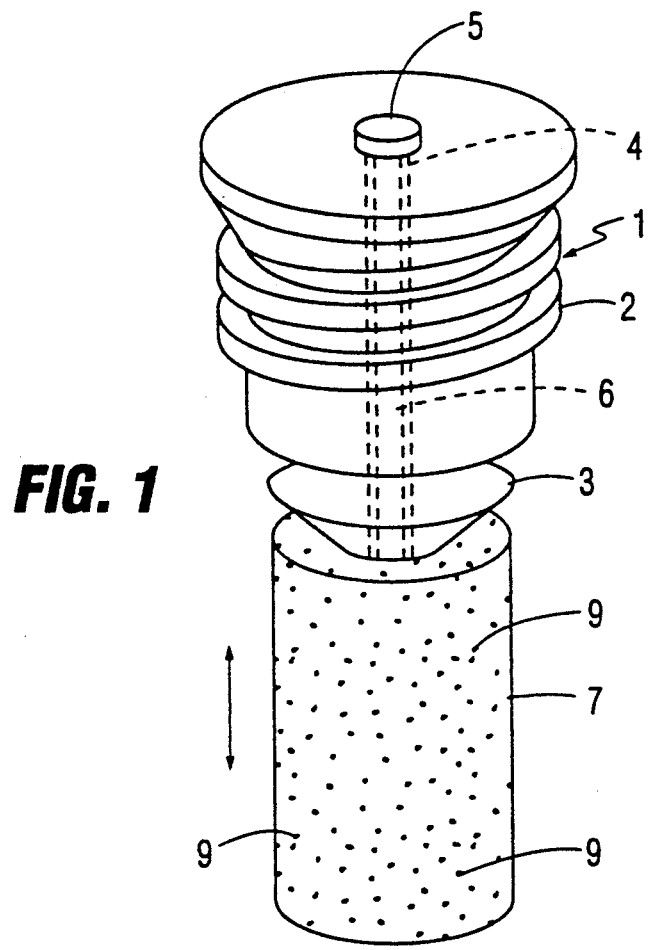
FIG. 1 is a perspective view showing an embodiment of the invention applied to a canteen.

FIG. 1 is a perspective view showing an essential part of one embodiment of the invention applied to a canteen.

Referring to FIG. 1, reference numeral 1 designates a plug for closing the top opening of a water or hot water accommodation section of a canteen or a vacuum bottle. The plug 1 has its outer periphery formed with a thread 2 to be meshed with a thread formed in the top opening noted above. Further, the bottom of the plug 1 is provided with a packing 3 having a rhombic sectional profile for preventing leakage.

The plug 1 has an axially central hole 4 serving as a water passage. A valve shaft 6 provided with a head 5 to be urged penetrates the hole 4. The valve shaft 6 is urged by a spring to operate a valve body for opening and closing the bottom of the hole 4. More particularly, by depressing the head 5 the valve shaft 6 is lowered against the spring force to open the water passage 4 and permit the contained water or hot water to flow out.

On the lower end of the valve shaft 6 is mounted a cylindrical stainless steel case 7, in which small ceramic masses principally composed of magnesium oxide and calcium oxide are mounted. The mounting is made by fitting the upper end of a pipe (FIG. 2) from the top of the case 7 into the inside thereof on the valve shaft 6. The case 7 is provided with a large number of water passage holes or pores 9. The passages or pores 9 have such a diameter that the small masses of ceramics will not spill out of them.

In the canteen or vacuum bottle shown in FIG. 1, when pouring the contained water into a cup or the like, water passes through the water passages 9 in the case 7 and touches the small ceramic masses contained in the case 7. At this time, magnesium and calcium components are dissolved in the water. It is thus possible to obtain mineral-containing water, which is tasty or free from bad odor.

Figure 2:
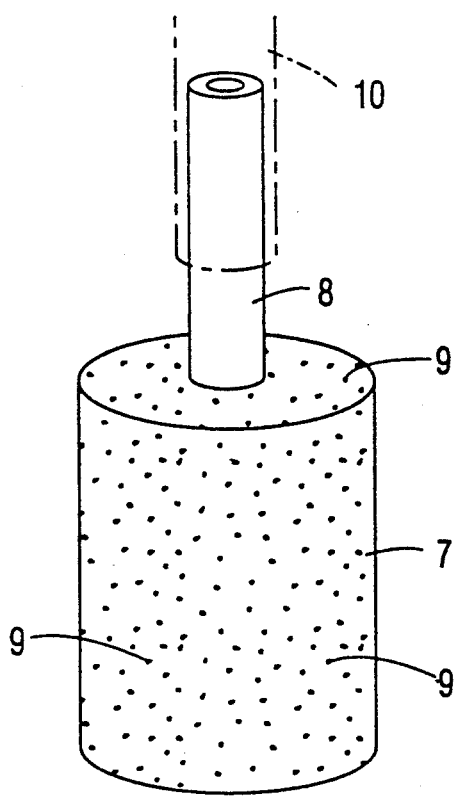
FIG. 2 is a perspective view showing a different embodiment of the invention applied to a water pump.

FIG. 2 shows a different embodiment of the invention. In this instance, the case 7 noted above is mounted on the lower end of a pipe 10, through which water is pumped. Again in this case, when pumping out water through the pipe 10, the water passes through the case immediately before it enters the pipe 10 and is thus rendered to be mineral-containing water in the manner as described before.

With the above construction of the device for producing mineral-containing water according to the invention, it is possible to produce only the necessary quantity of mineral-containing water without need of any different operation or appearance from those in the prior art. While the above embodiments are concerned with the canteen, vacuum bottle and water pump, the invention is of course applicable as well to tea pots, siphons and so forth.

The device for producing mineralcontaining water according to the invention, when used in the above way, is economical in that it permits only a necessary quantity of mineral-containing water to be provided for drinking when required. This operation is not unique. In addition, the device does not have any undesired appearance and can maintain an aesthetic sense.

Figure 3:
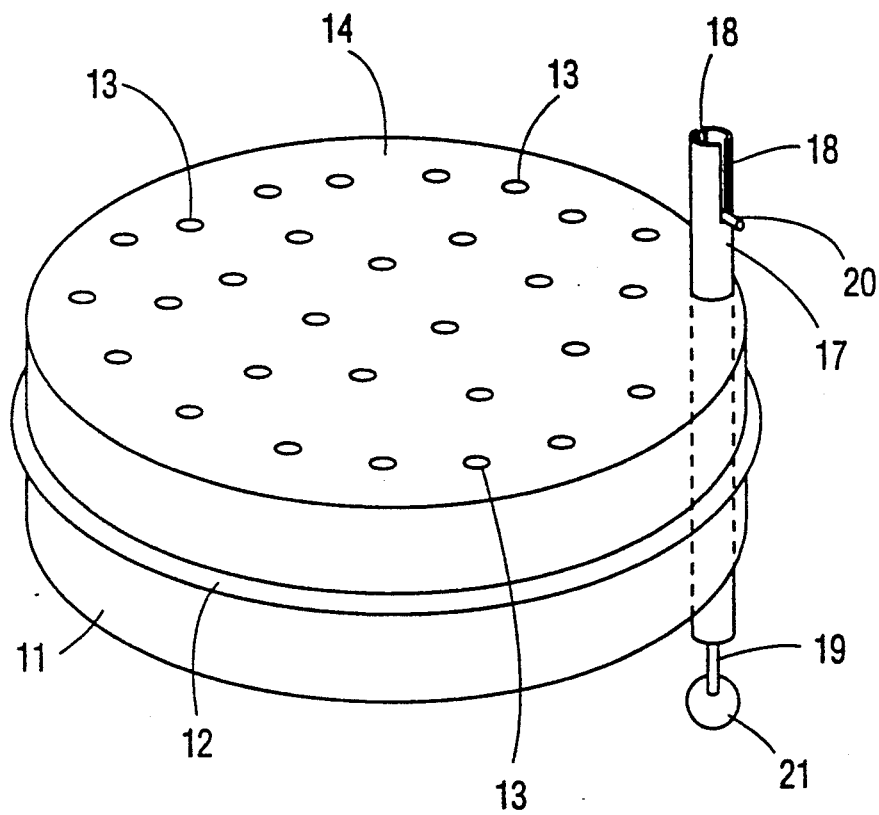
FIG. 3 is a perspective view showing a further embodiment of the invention applied to a mineral-containing water production device for a water vessel or a water trough.
Figure 4:
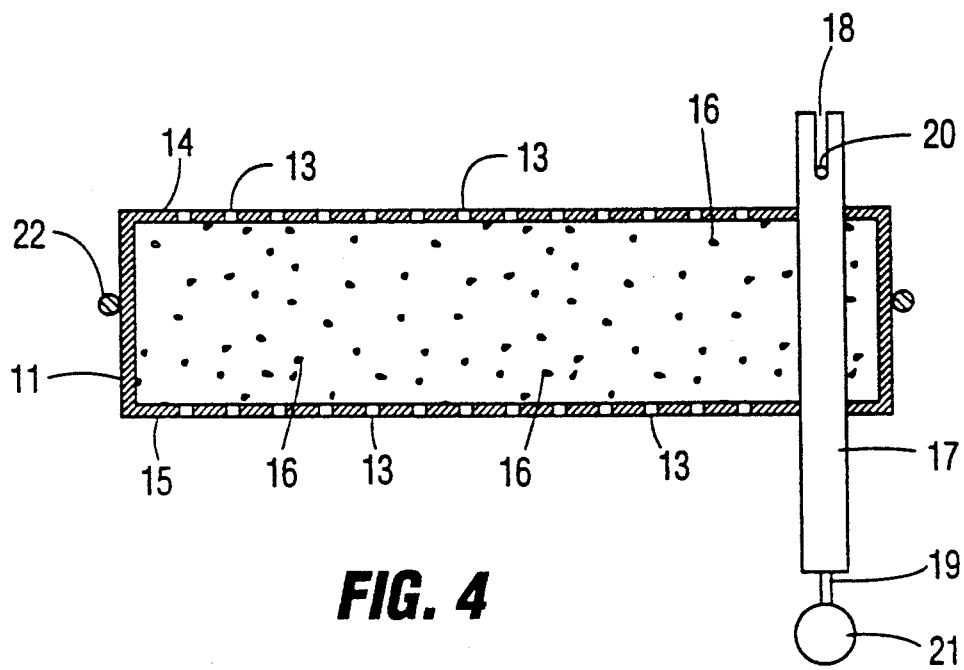
FIG. 4 is a sectional view showing the embodiment shown in FIG. 3.
Figure 5:
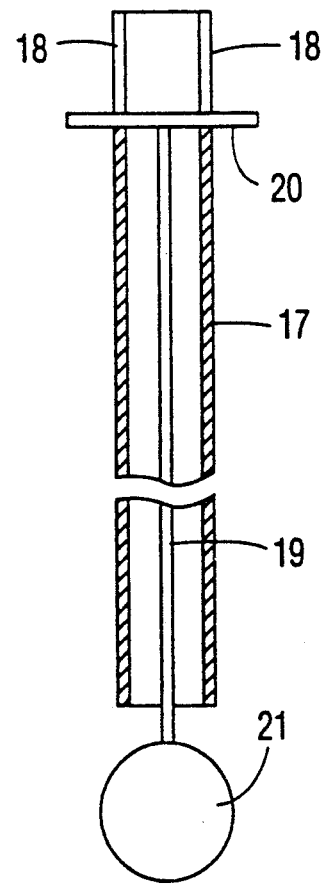
FIG. 5 is a sectional view showing an air ventilation pipe in the embodiment shown in FIG. 3.

FIGS. 3 to 5 show a further embodiment of the invention. More specifically, FIG. 3 is a perspective view showing an embodiment of the device for producing mineral-containing water according to the invention applied to a water vessel or trough, FIG. 4 is a sectional view showing the same embodiment, and FIG. 5 is a sectional view showing a ventilation pipe in the same embodiment.

Referring to FIGS. 3–5, reference numeral 11 designates a short cylindrical case, which is to be fitted in a water outlet of a water vessel or a water trough, for instance a lid fitting opening of a kettle or an upper opening of a pot, a jug, decanter and so forth. A ring-like rubber packing 12 is fitted as a slip checker on the outer periphery of the case 11.

Cover members 14 and 15 are provided on the upper and lower sides of the case 11. These cover members 14 and 15 have a large number of small water passages or pores 13 therein. The space defined by the cover members 14 and 15 and case 11 accommodates small ceramic masses 16 containing magnesium and calcium capable of being dissolved. In addition to the small ceramic masses 16, coral sand, deodorant active carbon, etc. may be accommodated.

Reference numeral 17 designates a ventilation pipe which penetrates both of the cover members 14 and 15. An open top portion of the ventilation pipe 17 is formed with a pair of diametrically opposed slits or notches 18.

Reference numeral 19 designates a thin rod inserted in the ventilation pipe 17. The upper end of the thin rod 19 is provided with a T-shaped hook 20, the opposite ends of which are received in the slits 18. To the lower end of the thin rod 19 is secured a water stop weight ball 21 having an outer diameter greater than the inner diameter of the ventilation pipe 17, the weight ball 21 and the open lower end of the ventilation pipe 17 are spaced apart to form a ventilation gap.

The device for producing mineral-containing water for a water vessel or a water trough, having the above construction, can be used by fitting it in the water outlet of a kettle, a pot, a jug, a decanter, etc. as noted above. To fit various water outlet sizes, the outer periphery of the upper cover member 14 may be provided with a flange for suspending the device. Further, the T-shaped hook 20 may be fitted in the ventilation pipe 17 such that it is concealed thereon. By fitting the device for producing mineral-containing water for a water vessel on a water outlet thereof and pouring water into the water vessel, water passes smoothly through the small water passages or pores 13 owing to the action of the atmospheric pressure introduced by the action of the ventilation pipe 17. Thus, the poured water is collected in the vessel while being rendered by the small ceramic masses 16 to be mineral-containing water. The water inlet and outlet of the pot, jug, decanter, etc. are the same top openings. In this case, when discharging the collected water, the weight ball 21 closes the lower end opening of the ventilation pipe to prevent water from being discharge through the ventilation pipe 17.

The device for producing mineral-containing water having the above construction according to the invention permits only a required quantity of water to be rendered to be mineral-containing water. This is very economical. In addition, it is only necessary to pour water, and no particular special operation is needed compared to the prior art. Further, the device itself is simple in construction and can be inexpensively provided to the user.

Figure 6:
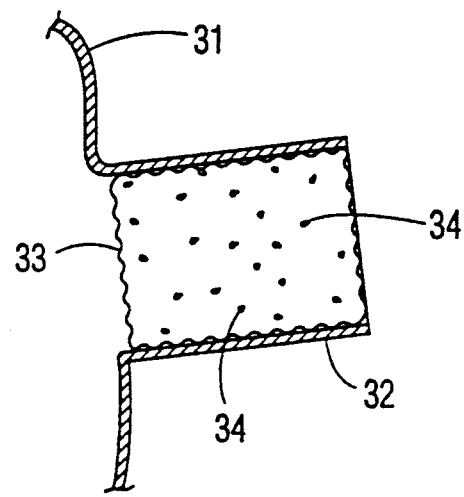
FIG. 6 is a fragmentary sectional view showing a further embodiment of the invention applied to a kettle.

FIG. 6 is a fragmentary sectional view showing a further embodiment of the invention applied to a kettle.

Referring to the FIG., reference numeral 31 designates a kettle, and 32 a water outlet of the kettle 31. A cylindrical member 33 in which is made from a metal mesh is removably fitted in the water outlet 32 of the kettle 31. The cylindrical member 33 accommodates small ceramic masses 34 principally composed of magnesium and calcium. The small ceramic masses 34 are greater in size than the mesh size of the cylindrical member 34, thus preventing them from getting out through the cylindrical member 34.

Figure 7:
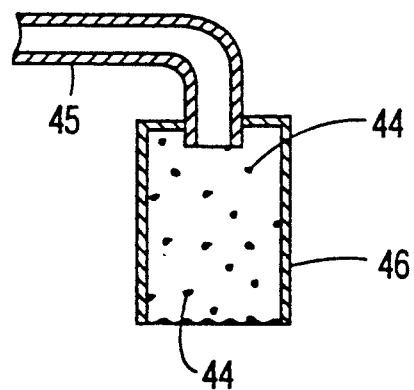
FIG. 7 is a fragmentary sectional view showing a further embodiment of the invention applied to a pot.

FIG. 7 is a fragmentary sectional view showing a further embodiment of the invention applied to a pot.

Referring to the FIG., reference numeral 45 designates a water outlet of the pot. Water contained in the pot is held under air pressure so that it will not flow out through the water outlet 45. On the water outlet 45 a cylindrical member 46 is removably fitted. The cylindrical member 46 has its top fitted on the water outlet 45. Alternatively, its top may be provided with a projection, which is fitted in or on the water outlet 45. At least the lower end of the cylindrical member 46 comprises a mesh permitting water passage. The cylindrical member 46 accommodates small ceramic masses 44 principally composed of magnesium and calcium.

Figure 8:
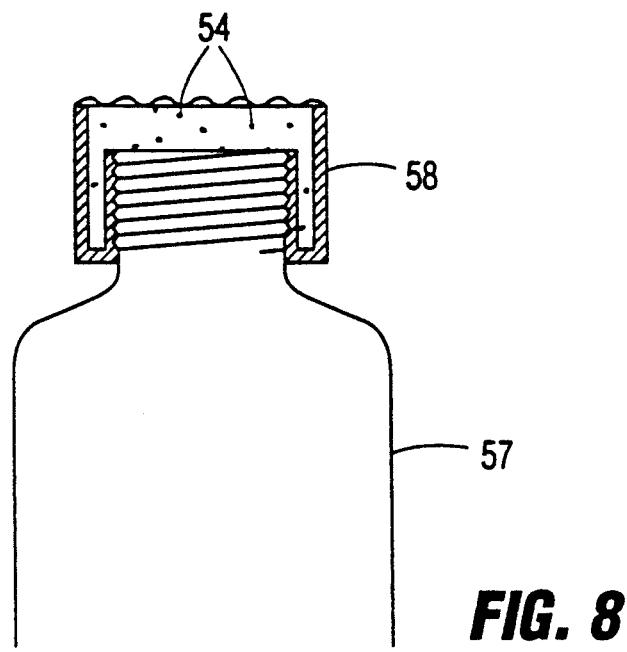
FIG. 8 is a fragmentary sectional view showing a further embodiment of the invention applied to a bottle.

FIG. 8 is a fragmentary sectional view showing a further embodiment of the invention applied to a plastic bottle.

Referring to FIG. 8, reference numeral 7 designates a plastic bottle. The device 58 for producing mineral-containing water is fitted on the open head or neck of the plastic bottle 57. The illustrated device 58 for producing mineral-containing water has an inverted channel-shaped sectional profile. Its inner peripheral surface is formed with a thread like that of a threaded cap. Thus, the device can be removably fitted on the head or neck of the plastic bottle. The device 58 is hollow, and its top comprises by a mesh to permit water passage. It accommodates small ceramic masses 54 principally composed of magnesium and calcium.

Figure 9:
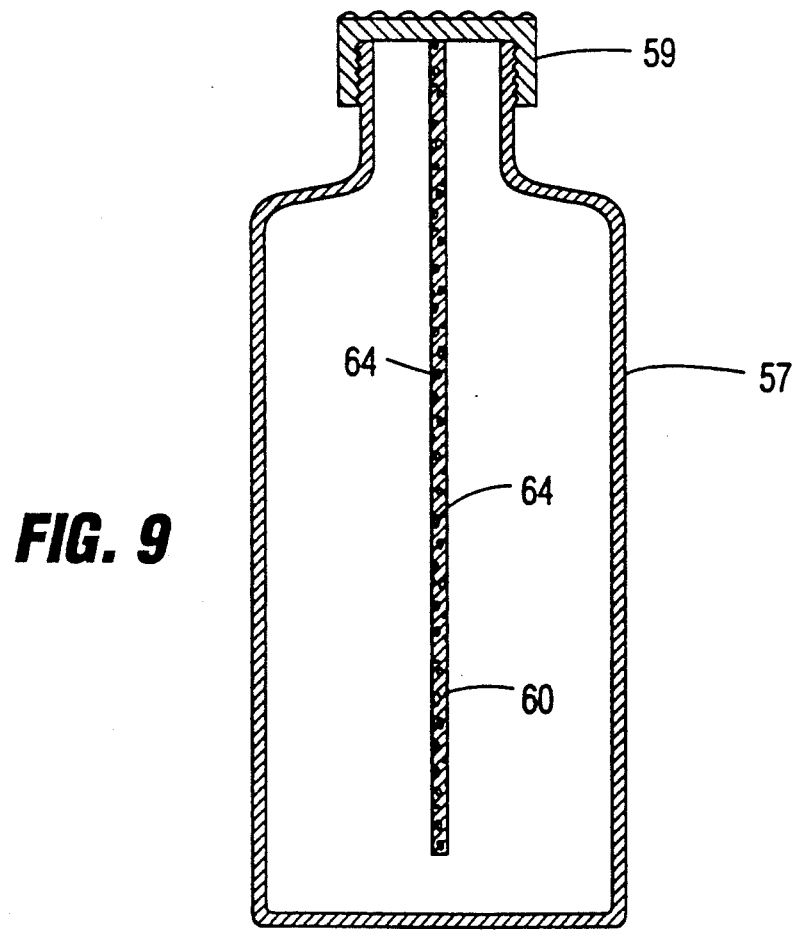
FIG. 9 is a fragmentary sectional view showing a modification of the embodiment shown in FIG. 8.

FIG. 9 is a fragmentary sectional view showing a modification of the embodiment of FIG. 8.

Like the embodiment of FIG. 8, this modification 59 of the device for producing mineral-containing water is fitted on the open head or neck of the plastic bottle 57. This device comprises a threaded cap with the top thereof comprising a mesh permitting water passage and a mesh pipe 60 depending substantially from the center of the inner surface of the threaded cap. The pipe 60 accommodates small ceramic masses 64 principally composed of magnesium and calcium. Thus, the contained water can be held as mineral-containing water at all times.

With the above devices for producing mineral-containing water for water storage devices shown in FIGS. 6 to 9, the contained water or hot water touches the small ceramic masses when the water is poured into a glass or the like. Thus, the magnesium and calcium components are dissolved in the water or hot water being poured, thus producing mineral-containing water. In the above embodiments small ceramic masses are used, but it is possible to additionally use deodorant active carbon capable of withstanding the boiling point of water or sterilization silver grains or coral sand as mineral-containing water production promotion material.

The device for a producing mineral-containing water for water storage device as described above according to the invention, does not permit wasteful production of mineral-containing water but production of only a necessary quantity of mineral-containing water for drinking or cooking. Thus, it is very economical. In addition, it is very simple in construction and can be provided as an inexpensive product and be readily replaced with a new one.

I claim:

1. A device for producing mineral-containing water, comprising:

a substantially cylindrical case having top and bottom walls, and adapted to be fitted in a water outlet of a water storage vessel;

said top and bottom walls of said substantially cylindrical case having water passage holes therein for permitting water passage therethrough;

a plurality of small masses of ceramics, serving as mineral-containing water production material, accommodated in said substantially cylindrical case between said top and bottom walls; and an air ventilation section provided at least in a part of said substantially cylindrical case;

said air ventilation section comprising a pipe penetrating said top and bottom walls of said cylindrical case and provided with a water stop member.

2. The device for producing mineral-containing water according to claim 1, wherein said plurality of small masses of ceramics are principally comprised of small masses of magnesium and calcium.

3. The device for producing mineral-containing water according to claim 1, wherein said case comprises means connectable with a plug member of the water storage vessel so as to be fitted into the water outlet of the water storage vessel.

4. The device for producing mineral-containing water according to claim 1, wherein said top and bottom walls of said substantially cylindrical case are made of a mesh material capable of passing water therethrough, said mesh material defining said water passage holes.

5. The device for producing mineral-containing water according to claim 1, wherein said case further comprises a cap member adapted to be screwed on an outlet of the water storage vessel for removably connecting said cylindrical case to said outlet of said water storage vessel.

6. The device for producing mineral-containing water according to claim 1, wherein said water passage means defines a plurality of water passages, said small masses of ceramics being retained in said water passages so as not to spill out of said water passages.

7. The device for producing mineral-containing water according to claim 1, wherein said water passage means defines a plurality of pores, said small masses of ceramics being retained in said pores so as not to spill out of said pores.

* * * * *